(12) United States Patent
Watanabe et al.

(10) Patent No.: US 8,358,496 B2
(45) Date of Patent: Jan. 22, 2013

(54) ELECTRIC DOUBLE-LAYER CAPACITOR

(75) Inventors: Hiroyuki Watanabe, Numazu (JP); Ron Horikoshi, Shizuoka (JP)

(73) Assignee: Meidensha Corporation, Tokyo (JP)

( * ) Notice: Subject to any disclaimer, the term of this patent is extended or adjusted under 35 U.S.C. 154(b) by 61 days.

(21) Appl. No.: 12/674,515

(22) PCT Filed: Aug. 29, 2008

(86) PCT No.: PCT/JP2008/065548
§ 371 (c)(1),
(2), (4) Date: Feb. 22, 2010

(87) PCT Pub. No.: WO2009/031470
PCT Pub. Date: Mar. 12, 2009

(65) Prior Publication Data
US 2011/0116211 A1    May 19, 2011

(30) Foreign Application Priority Data

Sep. 6, 2007  (JP) .................................. 2007-231269

(51) Int. Cl.
  *H01G 9/00* (2006.01)
  *H01G 5/01* (2006.01)
  *H01G 5/06* (2006.01)
  *H01G 5/38* (2006.01)
(52) U.S. Cl. ..................... 361/502; 361/278; 361/298.4; 361/299.2; 361/540
(58) Field of Classification Search .................. 361/278, 361/299.2, 540, 298.4, 502
See application file for complete search history.

(56) References Cited

U.S. PATENT DOCUMENTS
3,323,026 A    5/1967  Minami et al.
(Continued)

FOREIGN PATENT DOCUMENTS
JP     2-065003 A    3/1990
(Continued)

OTHER PUBLICATIONS
U.S. Appl. No. 12/674,528, filed Feb. 22, 2010, Mishima.
(Continued)

*Primary Examiner* — Eric Thomas
*Assistant Examiner* — Arun Ramaswamy
(74) *Attorney, Agent, or Firm* — Foley & Lardner LLP (57) ABSTRACT

A high reliable electric double layer capacitor is provided by increasing a sealing ability and strength of given portions of collecting terminals. In an electric double layer capacitor including a capacitor proper 1a produced by a plurality of stacked cells and an aluminum laminate film covering the exterior of the capacitor proper, a pair of collecting terminals 12 and 13 are provided at opposed portions of the capacitor proper 1a. Each collecting terminal 12 or 13 includes a first bent portion 12b or 13b that is bent to extend along a side surface 1b of the capacitor proper 1a and a second bent portion 12c or 13c that is bent to extend outward from a vertically middle position of the side surface 1b of the capacitor proper 1a. The second bent portions 12c and 13c of the pair of collecting terminals 12 and 13 are arranged to constitute a common plane and covered with the aluminum laminate film in such a manner that leading end portions of the pair of collecting terminals 12 and 13 protrude to the outside from the aluminum laminate film.

6 Claims, 5 Drawing Sheets

U.S. PATENT DOCUMENTS

| | | | |
|---|---|---|---|
| 4,783,723 A * | 11/1988 | Watanabe et al. | 361/502 |
| 6,147,305 A | 11/2000 | Honma et al. | |
| 6,392,868 B2 | 5/2002 | Ohya et al. | |
| 6,426,862 B1 | 7/2002 | Vasechkin et al. | |
| 7,095,605 B2 | 8/2006 | Suenaga et al. | |
| 7,209,342 B2 | 4/2007 | Matsui et al. | |
| 7,835,136 B2 | 11/2010 | Feaver et al. | |
| 2001/0021097 A1 * | 9/2001 | Ohya et al. | 361/502 |
| 2003/0054239 A1 | 3/2003 | Watanabe et al. | |
| 2004/0224226 A1 * | 11/2004 | Endo et al. | 429/184 |
| 2008/0266752 A1 | 10/2008 | Thrap et al. | |

FOREIGN PATENT DOCUMENTS

| | | |
|---|---|---|
| JP | 4-240708 A | 8/1992 |
| JP | 5-205872 A | 8/1993 |
| JP | 6-069080 A | 3/1994 |
| JP | 11-026953 A | 1/1999 |
| JP | 2002-313677 A | 10/2002 |
| JP | 2003-162989 A | 6/2003 |
| JP | 2003-217985 A | 7/2003 |
| JP | 2003-217986 A | 7/2003 |
| JP | 2004-040938 A | 2/2004 |
| JP | 2004-319098 A | 11/2004 |
| JP | 2005-183556 A | 7/2005 |
| JP | 2005-277346 A | 10/2005 |
| JP | 2006-024660 A | 1/2006 |
| JP | 2006-294985 A | 10/2006 |
| JP | 2006-303269 A | 11/2006 |
| JP | 2007-109775 A | 4/2007 |
| RU | 2 038 657 C1 | 6/1995 |
| TW | I242785 | 11/2005 |
| TW | 200631046 | 9/2006 |

OTHER PUBLICATIONS

U.S. Appl. No. 12/674,519, filed Feb. 22, 2010, Horikoshi.

M. Mishima, US PTO Non-Final Office Action, U.S. Appl. No. 12/674,528, dated Nov. 18, 2011, (16 pgs.).

R. Horikoshi, US PTO Non-Final Office Action, U.S. Appl. No. 12/674,519, dated Nov. 9, 2011, (16 pgs.).

R. Horikoshi, US PTO Notice of Allowance, U.S. Appl. No. 12/674,519, dated Mar. 8, 2012, (6 pgs.).

M. Mishima, US PTO Notice of Allowance, U.S. Appl. No. 12/674,528, dated Apr. 26, 2012, (10 pgs.).

* cited by examiner

ELECTRIC DOUBLE-LAYER CAPACITOR

TECHNICAL FIELD

The present invention relates to electric double layer capacitors.

BACKGROUND ART

The electric double layer capacitor is a device produced based on a principle in which positive and negative surfaces of polarized electrodes physically adsorb anion and cation of electrolyte for storing electric energy.

One concrete construction of such capacitor is described in for example after-mentioned Patent Document-1 is that shows a conventional bipolar type electric double layer capacitor (which will be called just as capacitor hereinafter). The capacitor of Patent Document-1 has the following construction. That is, a plurality of cells are stacked on one another. Each cell comprises two collecting plates each having one surface to which an activated carbon electrode is bonded, a gel-electrolyte film or separator put between the two collecting plates to constitute a unit, and a laminated sealing packing member put around the unit to constitute the cell. A unit of the stacked cells is tightly put between two end plates to constitute the capacitor that has a sealed construction. The capacitor uses two thin and flexible metal plates as collecting terminals. Each collecting terminal is put between one of the end plates and the corresponding collecting plate achieving electric connection of the collecting terminal with the collecting plate. The collecting terminals have respective portions that project to the outside of the capacitor keeping the sealed construction.

In a conventional capacitor described in after-mentioned Patent Document-2, for obtaining a sealed and hermetical construction, an aluminum laminate film is used as a cover member of the capacitor. By applying certain heat to the aluminum laminate film, the film is softened and intimately attached to an outer surface of the capacitor to constitute the sealed and hermetical construction of the capacitor. In this capacitor, thin aluminum films are used as collecting metals that serve also as collecting terminals. Each collecting metal protrudes to the outside of the capacitor along an inner surface of the corresponding aluminum laminate film, and a protruded portion of the collecting metal and the aluminum laminate film are subjected to a so-called heat seal process. With this, the collecting metals are protruded to the outside of the capacitor keeping the sealed construction.

Patent Document-1: Japanese Laid-open Patent Application (tokkai) 2003-217985

Patent Document-2: Japanese Laid-open Patent Application (tokkai) 2002-313677

Patent Document-3: Japanese Laid-open Patent Application (tokkai) 2006-024660

SUMMARY OF THE INVENTION

In order to provide an electric double layer capacitor with a high reliability, the capacitor should be constructed to block water (or moisture) from the outside. Such water blocking is necessary also in case of the bipolar type capacitor. As a way for blocking such external water, the above-mentioned sealing technique, which uses the aluminum laminate film, may be one effective way. However, since the bipolar type capacitor has such a construction that the positive and negative collecting terminals protrude from the vicinity of the end plates, usage of only the aluminum laminate film for effecting the heat seal process may induce a poor sealing.

In view of such possible poor sealing, in an aluminum laminate film heat welding device disclosed in the above-mentioned Patent Document-3, by matching a distance between two collecting terminal receiving grooves respectively formed in mutually displaceable lower crimping boards with a distance between a pair of collecting terminals protruding from the capacitor proper, the collecting terminals are appropriately set or put in the collecting terminal receiving grooves. Then, with this mutually positioned condition kept, suitable heat is applied to the aluminum laminate film. With this technique, undesired poor sealing is avoided.

However, in recent years, to meet the requirements for high voltage capacitors, organic electrolyte has been widely used. In the capacitors that use the organic electrolyte, blocking of water is much more assuredly needed for keeping the performance of the capacitor for a sufficiently long time, and thus, improvement in sealing and hermeticity is much highly requested. Particularly, for much more assuredly blocking water, it has become needed to suppress a poor welding that would be caused by water in a gaseous molecule state. Accordingly, for realizing the above-mentioned requirements, it is not sufficient to apply a conventional improvement to the construction of an aluminum laminate film heat welding device such as one disclosed in Patent Document-3. That is, for realization of the requirements, it is necessary to improve not only the construction of the capacitor proper but also the construction that surrounds the collecting terminals.

Regarding construction of the collecting terminals, it is preferable to make the collecting terminals not so large in thickness nor large in size for suppressing the poor welding and assuring the sealing. However, such measures may induce an insufficient strength of the construction of the collecting terminals.

Usually, the collecting terminals are made of an aluminum for suppressing corrosion of the collecting terminals that is caused when the electrolyte contacts the collecting terminals. Furthermore, if the volume of the collecting terminals is large and thus the heat capacity of the collecting terminals is high, the heat welding process fails to increase the temperature of the collecting terminals to a sufficiently high level and thus undesired poor welding tends to occur. Thus, the thickness and size of the collecting terminals should not be so large. However, in a conventional technique, an aluminum plate having a thickness of about 0.5 mm is used as a member for the collecting terminals, and thus, such conventional collecting terminals fail to to exhibit a satisfied resistance against bending and repeated load.

While, since, due to the inevitable nature, capacitors are constructed to have a low resistance and thus applied with a big electric current, a thick and heavy wire, such as one having a sectional area of 5.5 to 16 $mm^2$ is connected to each of the collecting terminals. Under process of connecting such thick and heavy wires to the collecting terminals, bending stress is repeatedly applied to the collecting terminals, and thus, if the wire connecting action and disconnecting action are repeated, it tends to occur that collecting terminals are broken at their bending portions due to stresses produced by such repeated connecting and disconnecting action. Even if the collecting terminals are not broken, the stresses caused by the repeated wire connecting and disconnecting action tends to induce a deformation of the collecting terminals and thus cause production of cracks in the welded portion, which tends to deteriorate the sealing performance and hermeticity.

The present invention is provided by taking the above-mentioned drawbacks into consideration and aims to provide an electric double layer capacitor that ensures reliability by increasing a sealing performance and mechanical strength at a given portion of a collecting terminal.

An electric double layer capacitor as defined in claim 1 which solves the above-mentioned drawbacks is a capacitor including a capacitor proper that is produced by a plurality of stacked cells and an aluminum laminate film that covers the exterior of the capacitor proper, which is characterized in that a pair of collecting terminals are provided that respectively contact with collecting electrode plates arranged at opposed portions of the capacitor proper; each collecting terminal includes a first bent portion that is bent to extend in the direction of the thickness of the capacitor proper along a side surface of the capacitor proper and a second bent portion that is bent to extend outward from a vertically middle position of the side surface; and
the second bent portions of the pair of collecting terminals are arranged to constitute a common plane and covered with the aluminum laminate film in such a manner that leading end portions of the pair of collecting terminals protrude to the outside from the aluminum laminate film.

An electric double layer capacitor as defined in claim 2 which solves the above-mentioned drawbacks is a capacitor as defined in claim 1, which is further characterized in that a root portion of each of the second bent portions is applied with plastic bodies that are put on the aluminum laminate film.

An electric double layer capacitor as defined in claim 3 which solves the above-mentioned drawbacks is a capacitor as defined in claim 1 or 2, which is further characterized in that each of the first bent portions is covered with an insulating sheathing.

An electric double layer capacitor as defined in claim 4 is a capacitor as defined in either one of claims 1 to 3, which is further characterized in that portions of the second bent portions that are to be covered with the aluminum laminate film are preliminarily applied with respective welding films that each contain a heat resistant plastic as a base, and the collecting terminals are covered with the aluminum laminate film through the respective welding films.

According to the present invention, the sealing ability and strength of given portions of the collecting terminals can be increased. As a result, the reliability of the electric double layer capacitor can be increased.

BEST MODE(S) FOR CARRYING OUT THE INVENTION

In the following, embodiments of an electric double layer capacitor according to the present invention will be described with reference to FIGS. 1 to 7B.

Embodiment-1

Figure 1:
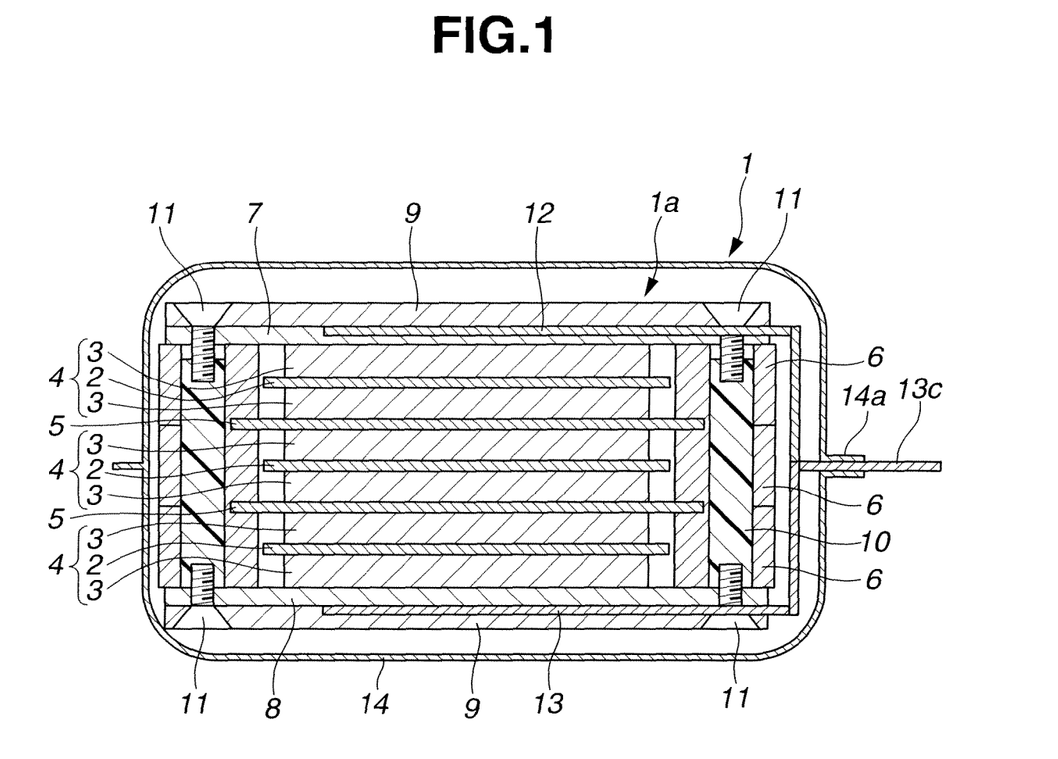
FIG. 1 is a schematically illustrated side sectional view of an embodiment of an electric double layer capacitor according to the present invention.

FIG. 1 is a schematically illustrated side sectional view of an embodiment of an electric double layer capacitor according to the present invention.

The electric double layer capacitor (which will be called just as "capacitor" hereinafter) 1 is of a bipolar type, and as is seen from FIG. 1, has a laminated construction which comprises a plurality of cells 4 that are stacked on one another through polarization base plates 5, each cell 4 including a flat separator 2 through which ions pass, and two activated carbon electrodes 3 between which the flat separator 2 is sandwiched. The capacitor shown in FIG. 1 is one example which has three stacked cells 4. Around each cell 4, there is disposed or sandwiched a packing or sealing member 6 for suppressing leakage of the electrolyte contained in the cell 4. The packing member 6 serves both as the sealing member and as an insulating member between the adjacent cells 4. In order to stack the cells 4, a certain number of cells 4 that assures a needed withstand voltage (withstand voltage of each cell is about 2.5V) and packing members 6 are stacked alternately on one another to constitute a unit, and flat collecting electrode plates 7 and 8 are connected to both end portions of the unit, and the stacked cells 5 and collecting electrode plates 7 and 8 are tightly put between two flat end plates 9, so that a hermetically sealed construction is provided. The two end plates 9 are pressed toward each other by screwing headed screws 11, through the end plates 9, into plastic spacers 10 each extending along a direction in which the cells 4 are stacked.

In the capacitor of stacked type unit, connecting lead wires to the collecting electrodes of the end surfaces of the metal electrodes brings about a series connection in the unit, and in this case, the capacitor can have a withstand voltage represented by (withstand voltage per cell)×(number of stacks). Unlike a capacitor having the same capacity that, for its production, employs a conventional take-up method, in the capacitor of stacked type unit, there is no need of using cables that would be installed in the unit for achieving the series connection, and thus, a compact construction with a high withstand voltage can be designed and thus the space for mounting thereon the construction can be reduced.

In the collecting construction of the capacitor 1, between each of the collecting electrode plates 7 and 8 and connecting one of the end plates 9, there is sandwiched a collecting terminal 12 or 13, and with the aid of the compressing force produced between each of the collecting electrode plates 7 and 8 and connecting one of the end plates 9, contacting of the collecting terminal 12 or 13 with the collecting electrode plate 7 or 8 is effected thereby to carry out passing of electrons therebetween. A capacitor proper 1a has the above-mentioned construction. As an outer sheath that covers the capacitor proper 1a, an aluminum laminate film 14 is used that functions to make water blocking. By drawing a part (for example, the part denoted by 13c in the drawing) of the collecting terminal 12 or 13 to the outside from a welded junction portion 14a of the aluminum laminate film 14, electric connection of the capacitor with an external electric member is achieved. The aluminum laminate film 14 comprises a base of aluminum, an outside protective layer made of PET that is a cross linked resin, and an inside deposited layer made of polyethylene that is a thermoplastic resin.

Figure 2:
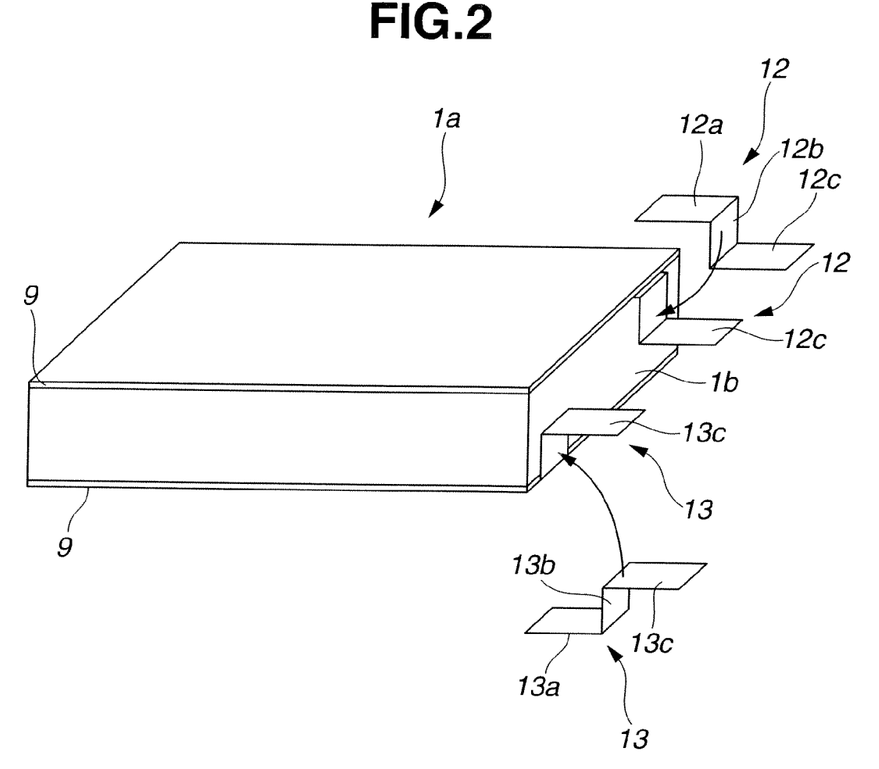
FIG. 2 is a perspective view of the electric double layer capacitor of FIG. 1, showing a manner for connecting collecting terminals to a capacitor proper.

As is seen from FIG. 2, the collecting terminal 12 or 13 has a crank-shaped cross section. More specifically, the collecting terminal comprises a base portion 12a or 13a that is to be put between the collecting electrode plate 7 or 8 and the corresponding one of the end plates 9, a first bent portion 12b or 13b that is bent from the base portion 12a or 13a to extend in a direction along a side surface 1b, that is in the direction of the thickness of the capacitor proper 1a (viz., in the direction in which the cells 4 are stacked), and a second bent portion 12c or 13c that is bent from the first bent portion 12b or 13b at a vertically middle portion in thickness of the side surface 1b of the capacitor proper 1a to extend toward the outside of the capacitor proper 1a.

At the same side surface 1b of the capacitor proper 1a, the base portions 12a and 13a of the collecting terminals 12 are 13 are each put between the collecting electrode plate 7 or 8 and the corresponding one of the end plates 9 allowing the second bent portions 12c and 13c to constitute a common plane. That is, the collecting terminals 12 and 13 protruding from the vicinity of the end plates 9 are provided with the above-mentioned second bent portions 12c and 13c that constitute the common plane. With such construction of the collecting terminals, an after-mentioned sealing method in which an aluminum laminate film 14 is treated by a flat heat press bar can be applied to the bipolar type capacitor. As a result, the sealing is improved and thus the reliability of the capacitor 1 is increased.

Figure 3A:
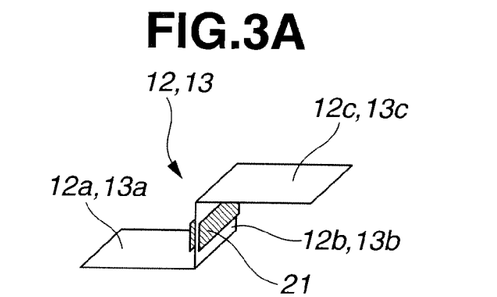
FIG. 3A is a perspective view of one example of collecting terminal for the electric double layer capacitor of FIG. 1.
Figure 3B:
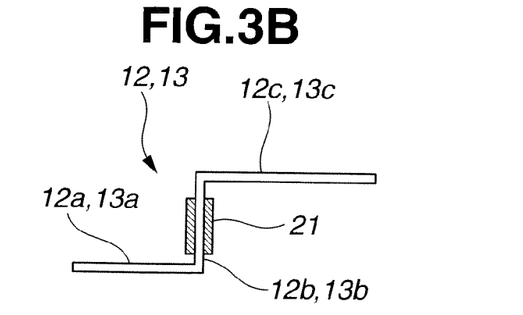
FIG. 3B is a sectional view of the example of collecting terminal of FIG. 3A.

Furthermore, as is seen from FIGS. 3A and 3B, if desired, the first bent portion 12b or 13b of the collecting terminal 12 or 13 may be covered with an insulating sheathing 21. That is, due to presence of such insulating sheathing 21 between the first bent portion 12b or 13b of the collecting terminal 12 or 13 and side surfaces of the cells 4, more particularly, the side end surfaces of the packing members 6, a vacuum-sealed arrangement is provided by the aluminum laminate film 14, and thus, even when the collecting terminals 12 and 13 are brought into contact with the packing members 6, the insulation performance of the packing members 6 is not affected. As a result, the reliability of the capacitor 1 can be increased. As the insulating sheathing 21, an adhesive tape made of a polytetrachloroethylene is used.

Figure 4A:
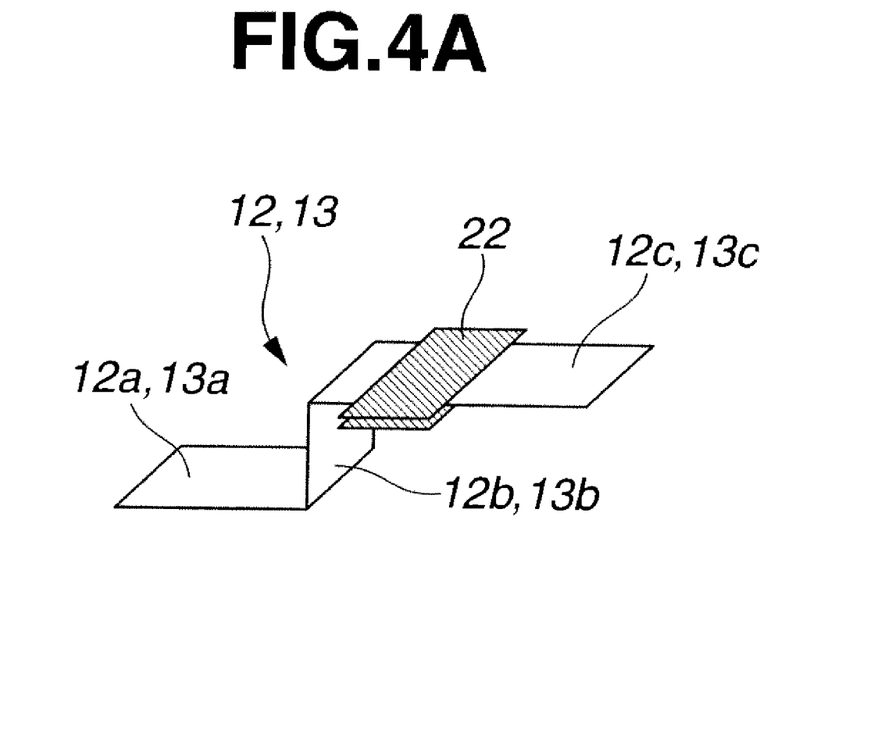
FIG. 4A is a perspective view of the other example of collecting terminal for the electric double layer capacitor of FIG. 1.
Figure 4B:
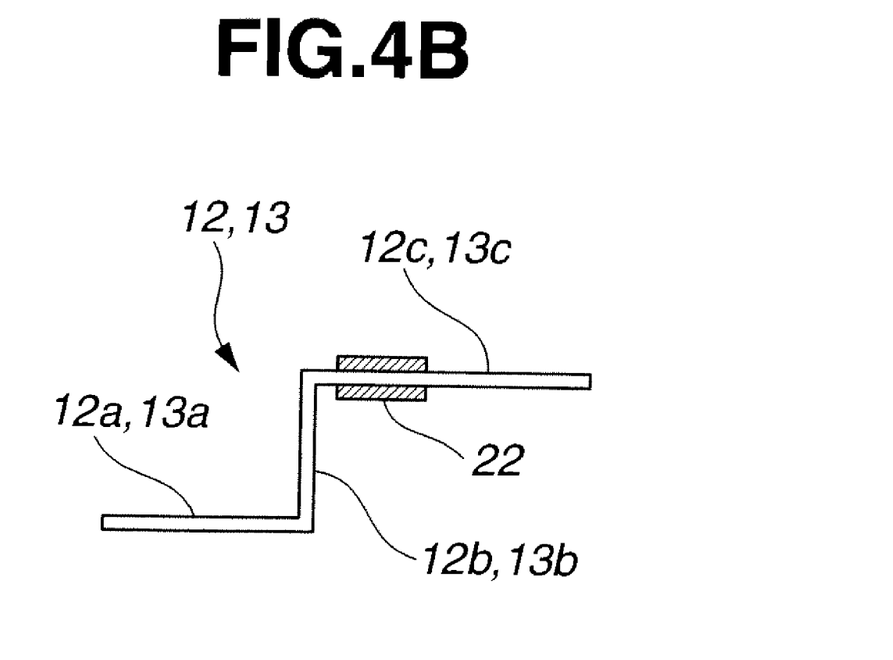
FIG. 4B is a sectional view of the other example of collecting terminal of FIG. 4A.

Furthermore, as is seen from FIGS. 4A and 4B, if desired, a heat resistant welding film 22 may be preliminarily applied to opposed surfaces of a given portion of the second bent portion 12c or 13c of the collecting terminal 12 or 13 to which the aluminum laminate film 14 is to be welded. As the welding film 22, a three-layered film is used that includes a base of heat resistant cross linked polyolefine and heat welding layers that cover both surfaces of the base. The reason of usage of such heat resistant welding film is that when the heat capacity of the capacitor 1 is increased, it is necessary to increase the amount of heat that is produced by a heater. That is, a high heat resistant performance is needed by the welding film. Accordingly, even when the amount of heat at the welding process is increased in accordance with the heat capacity of the capacitor 1, undesired melting of such high heat resistant welding film 22 is suppressed at the time when the collecting terminals 12 and 13 and the aluminum laminate film 14 are welded, and thus, the reliability of the vacuum-sealed arrangement is increased and thus the reliability of the capacitor 1 is increased.

Of course, a construction including the construction of FIGS. 3A and 3B and that of FIGS. 4A and 4B, more specifically, a construction in which the first bent portions 12b and 13b of the collecting terminals 12 and 13 are each covered with the insulating sheathing 21 and the given portions of the second bent portions 12c and 13c which are to be subjected to the welding are each preliminarily applied with the heat resistant welding film 22 can be employed in the invention.

Figure 5:
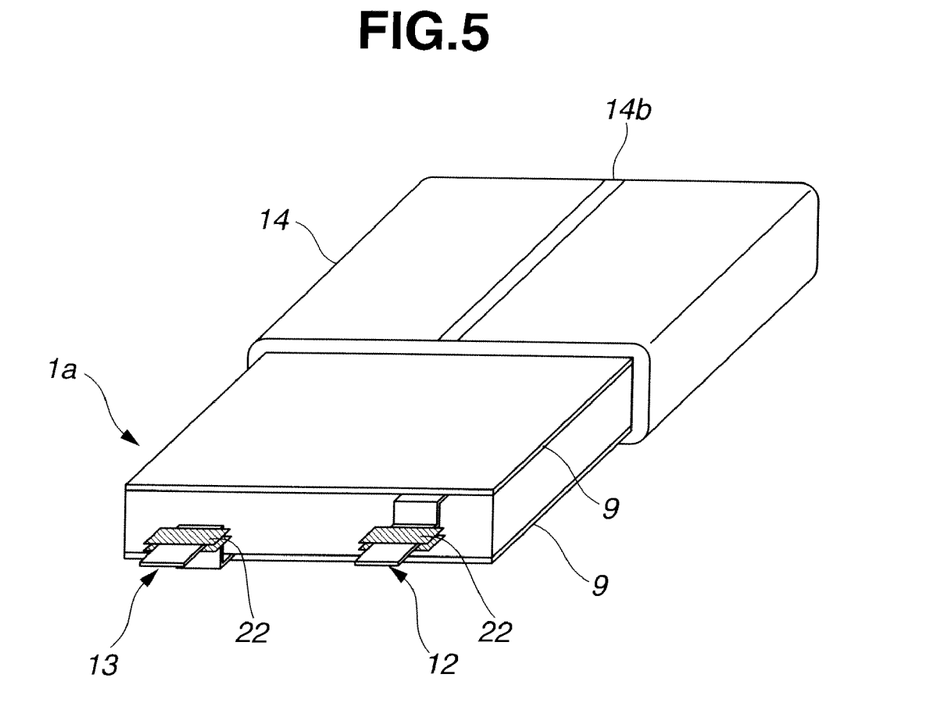
FIG. 5 is a perspective view of the electric double layer capacitor of FIG. 1, showing a manner for putting an aluminum laminate film onto the capacitor proper.
Figure 6:
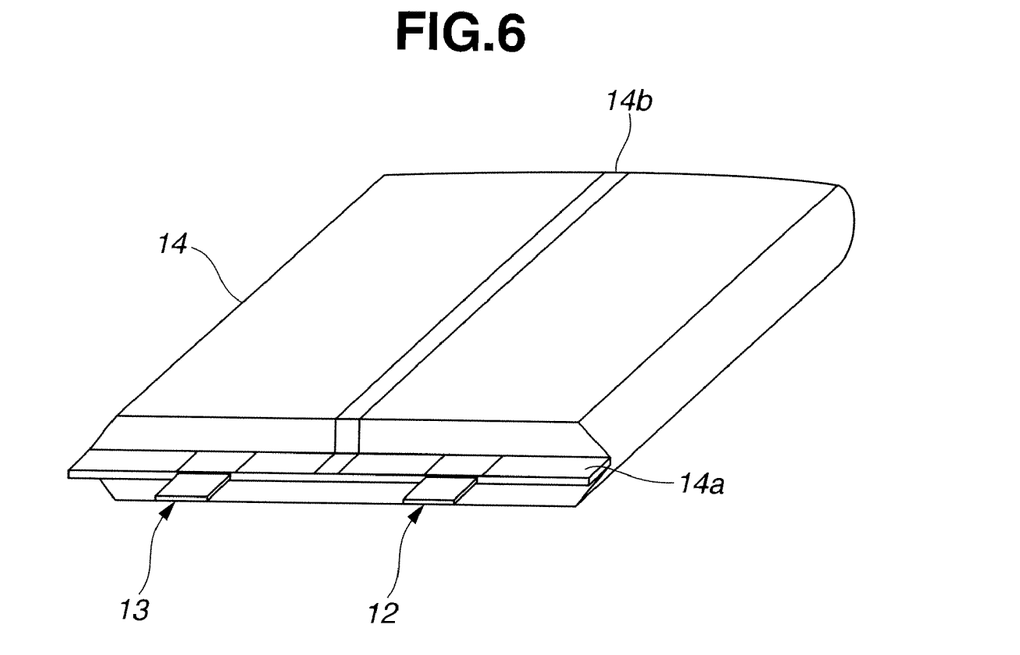
FIG. 6 is a perspective view of the electric double layer capacitor of FIG. 1, showing a manner for effecting a sealing of the aluminum laminate film to the capacitor proper.

The sealing welding at the given portion of the collecting terminal 12 or 13 by the aluminum laminate film 14 will be described with the aid of FIGS. 5 and 6. The collecting terminal 12 and 13 is so arranged that the base portion 12a or 13a is put between the collecting electrode plate 7 or 8 and corresponding one of the end plates 9, and the second bent portion 12c or 13c that forms an end portion of the collecting terminal protrudes to the outside from the capacitor proper 1a. To the second bent portion 12c or 13c, the above-mentioned heat welding film 22 is preliminarily applied. While, the aluminum laminate film 14 is subjected to a welding at a welding junction portion 14b to constitute a tubular member having both ends opened.

Then, into the aluminum laminate film 14 thus shaped tubular, there is inserted the capacitor proper is having the collecting terminals 12 and 13 connected thereto. Then, the portions of the collecting terminals 12 and 13 to which the heat welding films 22 are connected and one open end portion of the tubular aluminum laminate film 14 are subjected to a heat welding to constitute the welded junction portion 14a. With this, only end portions of the collecting terminals 12 and 13 protrude to the outside from the tubular aluminum laminate film 14.

In order to apply the heat welding to both the collecting terminals 12 and 13 to which the heat welding films 22 are connected and the open portion of the tubular aluminum laminate film 14 which are mated, two flat heat press bars are used for pressing and welding the mated portions. With this, the collecting terminals 12 and 13 and the aluminum laminate film 14 are united.

The heat press bars have flat and parallel pressing and heating surfaces, and each heat press bar has, at portions to which the collecting terminals 12 and 13, recesses each having depth represented by [{(thickness of the collecting terminal 12, 13)+(thickness of the base of heat welding film 22)+(thickness of the heat welding layers of the heat welding film 22)}×0.5. Like this, at the time when the collecting terminals 12 and 13 are subjected to the heat welding, the thickness of a portion that is to be welded is accurately controlled, and thus the heat welding durability at the sealed portion is assuredly obtained. Thus, the reliability of sealing performance possessed by the laminate film 14 is increased and thus, the reliability of the capacitor 1 is increased.

Then, the collecting terminals 12 and 13 and the aluminum laminate film 14, which have been united by the pressing and welding, are instantly cooled by being pressed by cooling bars that have a similar shape to the above-mentioned heat press bars or cooling bars one of which is a silicone pad. This cooling is for suppressing a positional deviation of the aluminum laminate film 14. By assuredly cooling the heat welded portion in a short time, displacement of the melted welding film 22 on surfaces of the collecting terminals 12 and 13 is prevented, and thus, the strength of the heat welded portion is increased thereby increasing the reliability of the capacitor 1.

Then, by using a vacuum sealer, air bleeding is effected from the other open end portion (viz., the open end portion opposite to that to which the collecting terminals 12 and 13 are welded) of the tubular aluminum laminate film 14, and then, impulse heating and cooling are applied in order to the open end portion, so that the capacitor proper 1a is hermetically or vacuum-sealed in the aluminum laminate film 14.

Embodiment-2

Figure 7A:
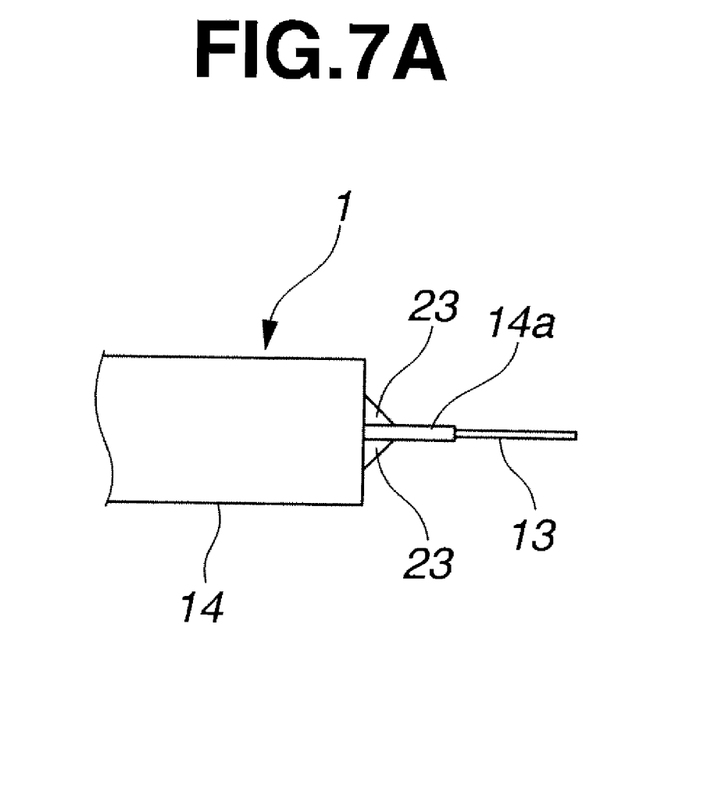
FIG. 7A is a schematically illustrated side view of another embodiment of an electric double layer capacitor according to the present invention.
Figure 7B:
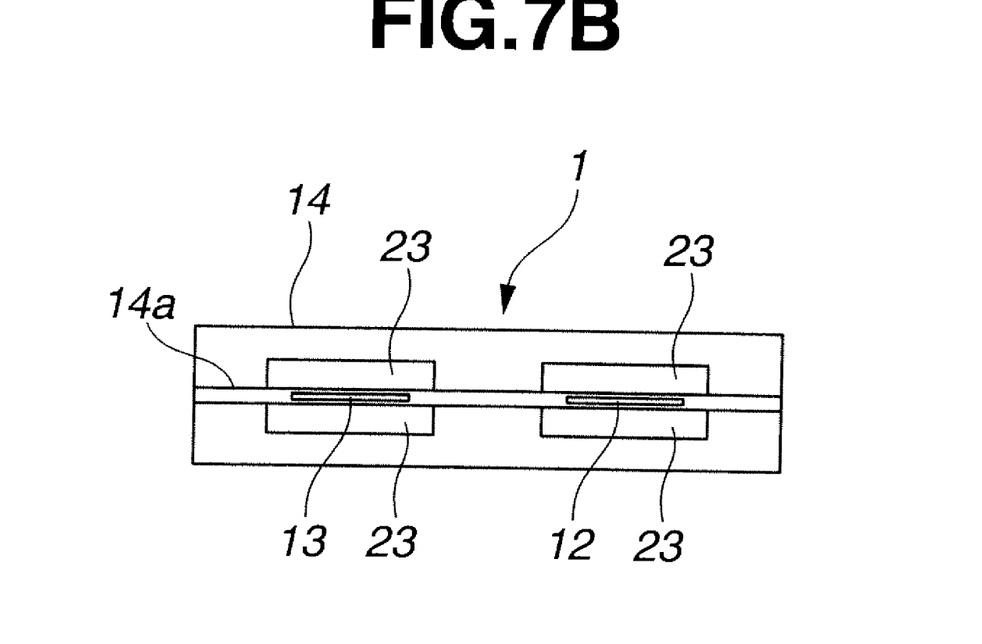
FIG. 7B is a schematically illustrated front view of the embodiment of FIG. 7A.

FIGS. 7A and 7B are schematic views of another embodiment of an electric double layer capacitor, in which FIG. 7A a side view of the capacitor and FIG. 7B is a front view of the capacitor. The capacitor of this embodiment is constructed to have a higher reliability than the above-mentioned capacity of the embodiment-1. The basic construction of this embodiment is substantially the same as that of the embodiment-1, and thus, from the following description, explanation on a construction that is the same as the embodiment-1 will be omitted and the same elements are denoted by the same reference numerals.

As has been mentioned in the section of the embodiment-1, a bending process is used for providing the collecting terminals 12 and 13 with a crank-shaped cross section, and thus, root portions (or bent portions) of the second bent portions 12c and 13c easily receive a stress. Furthermore, since the collecting terminals 12 and 13 have external wires connected thereto, the collecting terminals 12 and 13 tend to receive a certain stress at the time when the external wires are connected to the terminals 12 and 13. The collecting terminals 12 and 13 are of a member whose thickness is very small, that is, about 0.5 mm. Accordingly, when the collecting terminals 12 and 13 are repeatedly applied with an external stress, it tends to occur that the root portions (or bent portions) of the second bent portions 12c and 13c are broken.

Accordingly, in the capacitor of this embodiment, the collecting terminals 12 and 13 are each constructed to have an increased durability against an external stress applied thereto, as compared with the capacitor of the above-mentioned embodiment-1. That is, in the embodiment-2, the root portion of the second bent portion 12c or 13c to which the external stress is largely applied is applied with plastic bodies 23 that are put on the aluminum laminate film 14. More specifically, the plastic bodies 23 have each a triangular cross section and are so arranged that at the welded junction portion of the aluminum laminate film 14 through which the collecting terminals 12 and 13 protrude to the outside, both surfaces of the collecting terminals 12 and 13 are entirely put in a vertical direction by the plastic bodies 23. The base of the triangle possessed by the section of one plastic body 23 (viz., the side that extends along the side surface of the capacitor 1) has a length of about 5 to 10 mm.

The material of the plastic bodies 23 is freely selected from a group of plastics whose material is a liquid substance that is able to be coated to corners and hardened and the hardened material has such a property as to intimately contact with the aluminum laminate film 14. That is, various materials are usable as long as the above-mentioned condition is fulfilled. That is, for example, a hot melt adhesive of EVA system that goes into a liquid state at a temperature of about 120° C., an epoxy adhesive that can be cured at a room temperature and the like can be used as the material of the plastic bodies.

As is described hereinabove, the root portions of the second bent portions 12c and 13c of the collecting terminals 12 and 13 to which an external stress is concentrated is provided with the above-mentioned plastic bodies 23. Accordingly, even when the external stress is applied to the root portions, the energy of the stress can be scattered and thus the durability of the collecting terminals 12 and 13 is remarkably increased.

Thus, the probability that faulty electrical continuity takes place due to a breakage is remarkably reduced, and thus, the reliability of the capacitor 1 is increased.

In the electric double layer capacitor according to the present invention, materials used for producing the internal constitution may be known materials. For example, the polarized electrodes may be activated carbon electrodes, the electrolyte may be a solution of organic solvent with ammonium salt or ionic liquid, the separator may be produced from fiber system or polyolefine system, the packing member may be produced from a solvent resistant rubber, and the collecting electrodes and the collecting terminals may be produced from aluminum.

The present invention is particularly suitable to an electric double layer capacitor of stacked bipolar type.

The invention claimed is:

1. An electric double layer capacitor including a capacitor proper that is produced by a plurality of stacked cells and an aluminum laminate film that covers an exterior of the capacitor proper, comprising:
   a pair of collecting terminals that respectively contact with collecting electrode plates arranged at opposed portions of the capacitor proper;
   each collecting terminal includes a first bent portion that is bent to extend in a direction of a thickness of the capacitor proper along a side surface of the capacitor proper and a second bent portion that is bent to extend outward from a vertically middle position of the side surface;
   the second bent portions of the pair of collecting terminals are arranged to constitute a common plane and covered with the aluminum laminate film in such a manner that leading end portions of the pair of collecting terminals protrude to an outside from the aluminum laminate film;
   a root portion of each of the second bent portions is applied with plastic molds that are put on the aluminum laminate film; and
   a plurality of plastic bodies, each plastic body having a triangular cross section, arranged such that at a welded junction portion of the aluminum laminate film through which the collecting terminals protrude to the outside, both surfaces of the collecting terminals are sandwiched by the plastic bodies.

2. The electric double layer capacitor as claimed in claim 1, wherein each of the first bent portions is covered with an insulating sheathing.

3. The electric double layer capacitor as claimed in claim 1, wherein portions of the second bent portions that are to be covered with the aluminum laminate film are preliminarily applied with respective welding films that each contain a heat resistant plastic as a base, and the collecting terminals are covered with the aluminum laminate film through the respective welding films.

4. The electric double layer capacitor as claimed in claim 1, wherein a base of the triangular cross section of each plastic body has a length of about 5 to 10 mm.

5. The electric double layer capacitor as claimed in claim 1, wherein the plastic bodies are each made of either a hot melt adhesive or an epoxy adhesive.

6. The electric double layer capacitor as claimed in claim 1,
   wherein each of the first bent portions is covered with an insulating sheathing, and
   wherein portions of the second bent portions that are to be covered with the aluminum laminate film are preliminarily applied with respective welding films that each contain a heat resistant plastic as a base, and the collecting terminals are covered with the aluminum laminate film through the respective welding films.

* * * * *